(12) United States Patent
Martin

(10) Patent No.: US 7,308,448 B1
(45) Date of Patent: Dec. 11, 2007

(54) METHOD AND APPARATUS FOR IMPLEMENTING A LOCK-FREE SKIP LIST THAT SUPPORTS CONCURRENT ACCESSES

(75) Inventor: Paul A. Martin, Arlington, MA (US)

(73) Assignee: SUN Microsystems, Inc, Santa Clara, CA (US)

( * ) Notice: Subject to any disclaimer, the term of this patent is extended or adjusted under 35 U.S.C. 154(b) by 846 days.

(21) Appl. No.: 10/805,095

(22) Filed: Mar. 19, 2004

Related U.S. Application Data

(60) Provisional application No. 60/456,792, filed on Mar. 21, 2003.

(51) Int. Cl.
*G06F 7/00* (2006.01)
*G06F 3/00* (2006.01)

(52) U.S. Cl. .............................................. 707/8; 710/7

(58) Field of Classification Search ..................... None
See application file for complete search history.

(56) References Cited

U.S. PATENT DOCUMENTS

| | | | | |
|---|---|---|---|---|
| 6,493,706 | B1 * | 12/2002 | Mead et al. | 707/3 |
| 6,505,283 | B1 * | 1/2003 | Stoney | 711/170 |
| 6,687,699 | B1 * | 2/2004 | Courey, Jr. | 707/10 |
| 6,816,945 | B2 * | 11/2004 | Harris et al. | 711/135 |
| 6,988,180 | B2 * | 1/2006 | Kadatch | 711/216 |
| 7,065,765 | B2 * | 6/2006 | Cadden et al. | 718/102 |
| 7,117,502 | B1 * | 10/2006 | Harris | 719/315 |
| 2001/0056420 | A1 * | 12/2001 | Steele et al. | 707/8 |
| 2003/0120623 | A1 * | 6/2003 | Cadden et al. | 707/1 |

OTHER PUBLICATIONS

Publication entitled "The Repeat Offender Problem: A Lock-Free Mechanism for Supporting Dynamic-Sized Data Structures", by Maurice Herlihy et al.

Publication entitled "A Skip List Cookbook", by William Pugh, UMIACS-TR-89-72.1, CS-TR-2286.1, Jul. 1989, Revised Jun. 1990.

Publication entitled "Concurrent Maintenance of Skip Lists" by William Pugh et al., CS-TR-2222.1, Apr. 1989, Revised Jun. 1990.

* cited by examiner

*Primary Examiner*—Andrew C. Lee
(74) *Attorney, Agent, or Firm*—Park, Vaughan & Fleming, LLP

(57) ABSTRACT

One embodiment of the present invention provides a system that supports concurrent accesses to a skip list that is lock-free, which means that the skip list can be simultaneously accessed by multiple processes without requiring the processes to perform locking operations. During a node deletion operation, the system receives reference to a target node to be deleted from the skip list. The system marks a next pointer in the target node to indicate that the target node is deleted, wherein next pointer contains the address of an immediately following node in the skip list. This marking operation does not destroy the address of the immediately following node, and furthermore, the marking operation is performed atomically and thereby without interference from other processes. The system then atomically modifies the next pointer of an immediately preceding node in the skip list to point to an immediately following node in the skip list, instead of pointing to the target node, thereby splicing the target node out of the skip list.

27 Claims, 5 Drawing Sheets

METHOD AND APPARATUS FOR IMPLEMENTING A LOCK-FREE SKIP LIST THAT SUPPORTS CONCURRENT ACCESSES

RELATED APPLICATION

This application hereby claims priority under 35 U.S.C. §119 to U.S. Provisional Patent Application No. 60/456,792, filed on 21 Mar. 2003, entitled "Practical Lock-Free Skip List," by inventor Paul A. Martin.

BACKGROUND

1. Field of the Invention

The present invention relates to the design of lookup structures within computer systems. More specifically, the present invention relates to a method and apparatus for implementing a lock-free skip list that supports concurrent accesses within a computer system.

2. Related Art

A skip list is a dynamically sized sorted linked list that offers logarithmic time performance for searching, inserting, and deleting elements. William Pugh developed a basic design for a skip list to be used by a single thread (see "A Skip List Cookbook," by William Pugh, University of Maryland Institute for Advanced Computer Studies UMI-ACS Technical Report No. UMIACS-TR-89-72.1).

A skip list is neither a single list (which takes linear search time), nor a tree (which requires re-balancing whenever it grows lop-sided in order to avoid requiring linear search time), but instead has an indexing scheme that is incorporated into its basic list structure.

Nodes in a skip list are mostly just normal linked-list nodes, but a procedure using random numbers chooses to make some of the new additions taller than the baseline—these serve to index into the list with search time proportional to the logarithm of the size of the list. Adjusting the distribution of random numbers selects the base of the logarithm—using more "tall" nodes reduces search time at the expense of the extra space; using shorter average heights is more compact but yields slower searches.

The head of the skip list is a special sentinel node representing negative infinity and carrying a set of pointers that are as "high" as the tallest node can be. The tail of the skip list is logically a terminator sentinel of similar height representing positive infinity, though it may be simulated by null pointers. The head pointers and all other pointers in the skip list point "forward" to the next node that reaches the "height" of that pointer. The top pointers may be missing, but once there is a node as tall as a given height, all those pointers "shorter" than it will be filled in.

Locating a given node (or where a future one will be inserted) is done by following the tallest pointer chain keeping track of a predecessor and successor nodes until the successor node has a value higher than the target node. This process loops by descending to the next lower layer and following the predecessor links at that level until the bottom layer is reached.

Subsequent to his description of the canonical skip list, Pugh also developed a technique based on locks to use skip lists in a multi-threaded environment (see "Concurrent Maintenance of Skip Lists," by William Pugh, University of Maryland Technical Report No. CS-TR-2222.1 1989). However, when large numbers of processes access a skip list concurrently, contention for locks can become a serious impediment to system performance.

Hence, what is needed is a method and an apparatus for accessing a skip list in a multi-threaded environment without the performance problems associated with locks.

SUMMARY

One embodiment of the present invention provides a system that supports concurrent accesses to a skip list that is lock-free. The term "lock-free" means that the skip list can be simultaneously accessed by multiple processes without requiring the processes to perform locking operations (non-blocking), and furthermore that a finite number of operations by a thread will guarantee progress by at least one thread (lock-free). During a node deletion operation, the system receives reference to a target node to be deleted from the skip list. The system marks a next pointer in the target node to indicate that the target node is deleted, wherein next pointer contains the address of an immediately following node in the skip list. This marking operation does not destroy the address of the immediately following node, and furthermore, the marking operation is performed atomically and thereby without interference from other processes. The system then atomically modifies the next pointer of an immediately preceding node in the skip list to point to an immediately following node in the skip list, instead of pointing to the target node, thereby splicing the target node out of the skip list.

In a variation on this embodiment, after the target node is spliced out of the skip list, the system modifies the next pointer of the target node so that the next pointer remains marked but points to the immediately preceding node instead of the immediately following node in the skip list.

In a variation on this embodiment, a node in the skip list can possibly be a tall node that includes one or more higher-level next pointers, wherein a given higher-level next pointer contains the address of the immediately following node in the skip list that reaches or exceeds the height of the given higher-level next pointer. In this variation, if the target node is a tall node, the node deletion operation additionally marks and splices around higher-level next pointers in the target node.

In a variation on this embodiment, marking the next pointer to indicate that the target node is deleted involves setting a "deleted bit" in the next pointer.

In a variation on this embodiment, marking the next pointer to indicate that the target node is deleted involves: creating a special node with a deleted type, which points to the immediately following node in the skip list; and atomically replacing the next pointer with a pointer to special node.

In a variation on this embodiment, during a node insertion operation, which inserts a new node into the skip list, the system locates a node immediately preceding the new node in the skip list. This involves maintaining a predecessor array, wherein for each level of the skip list, the predecessor array contains a pointer to the node immediately preceding the new node in the skip list. The system also locates a node immediately following the new node in the skip list. This involves maintaining a successor array, wherein for each level of the skip list, the successor array contains a pointer to the immediately following node. Finally, the system splices the new node into the skip list by: setting the next pointer for the new node to point to the immediately following node; atomically updating the next pointer of the immediately preceding node to point to the new node; and if the new node is a tall node, similarly splicing higher-level next pointers associated with the new node.

In a variation on this embodiment, the system is configured to remove a highest priority node from the skip list through a constant time operation, wherein the head node of the skip list points to the highest priority node for ease of deletion, and wherein keys for nodes are chosen to achieve this ordering.

In a variation on this embodiment, the system periodically performs a garbage-collection operation to reclaim deleted nodes that have become unreachable.

In a variation on this embodiment, the target node includes: a key that contains a priority value for the node in the skip list; a value field that contains or points to data associated with the node; a next pointer that contains the address of an immediately following node in the skip list; and zero or more higher-level next pointers, wherein a given higher-level next pointer contains the address of the immediately following node in the skip list that reaches or exceeds the height of the given next pointer.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Skip List Node

Figure 1:
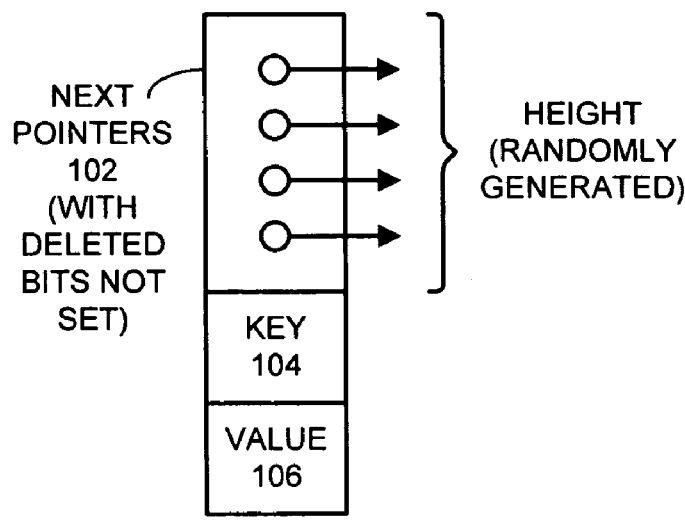
FIG. 1 illustrates a live node as it might appear in a skip list in accordance with an embodiment of the present invention.

FIG. 1 illustrates a live node 100 as it might appear in a skip list in accordance with an embodiment of the present invention. Node 100 includes a key 104, which contains a priority value used to index node 100 within the skip list. Node 100 also includes a value 106, which either contains or points to data associated with node 100. Node 100 additionally includes an array of next pointers 102. The lowest-level next pointer in this array contains the address of an immediately following node in the skip list, whereas higher-level next pointers contain addresses for immediately following nodes in the skip list that reach the height of each higher-level next pointer.

As was described above, in one embodiment of the present invention, the height of the array of next pointers 102 is determined randomly during the node creation process. Furthermore, every next pointer also includes a "deleted bit," which indicates whether or not node 100 has been deleted as is explained below with reference to the node deletion process. Note that a node is "deleted" when the bottom (lowest-level) pointer is so marked; deletions of higher-level pointers effectively "shrink" the height of the node.

Empty Skip List

Figure 2:
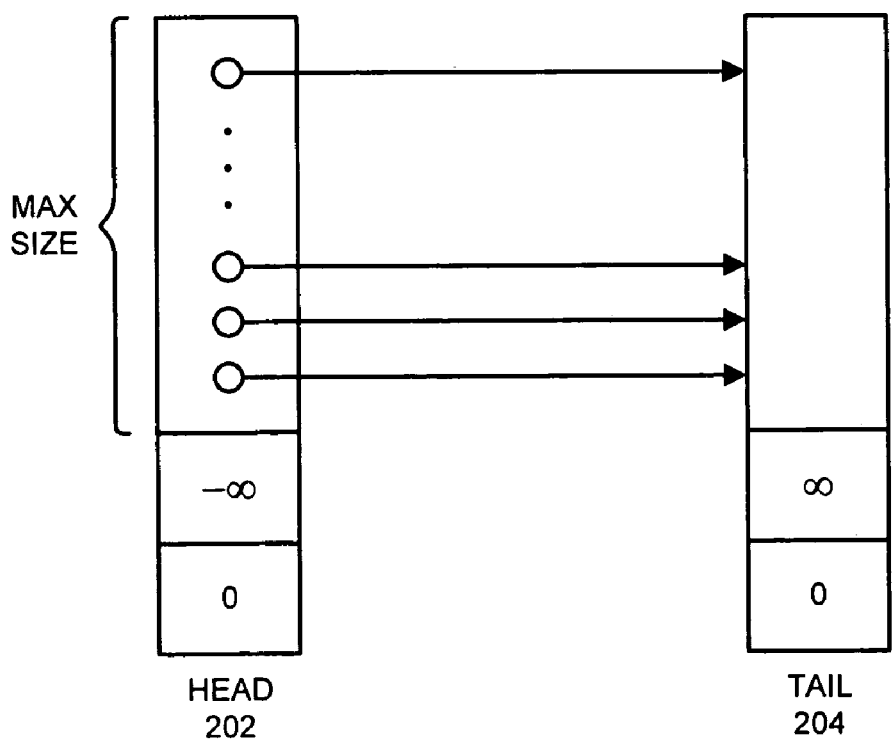
FIG. 2 illustrates an empty skip list in accordance with an embodiment of the present invention.

FIG. 2 illustrates an empty skip list 200 in accordance with an embodiment of the present invention. This empty skip list 200 includes a head node 202 and a tail node 204. Head node 202 and tail node 204 are dummy nodes, which do not contain real data values. The key field of the head node 202 is set to $-\infty$ so that it is smaller than any key in the skip list, and the key field of the tail node 204 is set to $+\infty$ so that it is larger than any key in the skip list. The value fields in the head node 202 and the tail node 204 are set to zero. Note that all values and keys in dummy nodes may be ignored if the implementation checks for equality to the dummy node.

Head node 202 includes an array of next pointers. This array is configured to be the maximum size of any array of pointers in any node in the skip list. Since the skip list in FIG. 2 is empty, these next pointers are initialized to point to the tail node 204.

Populated Skip List

Figure 3:
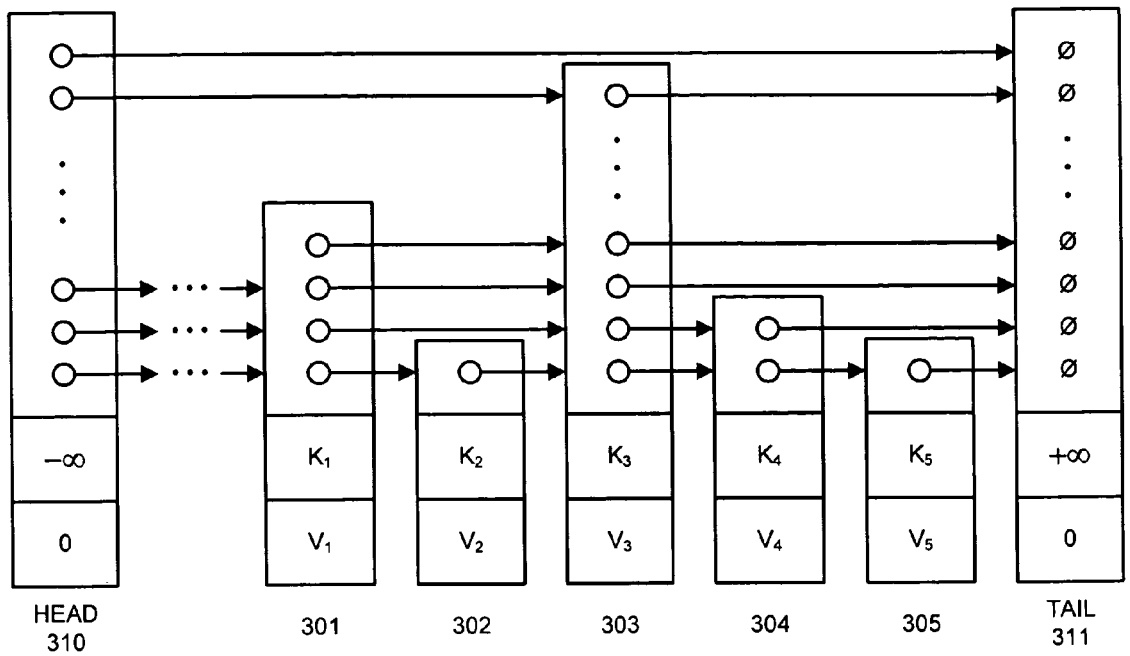
FIG. 3 illustrates an exemplary skip list populated with five visible nodes in accordance with an embodiment of the present invention.

FIG. 3 illustrates an exemplary skip list 300 populated with five visible nodes 302-307 in accordance with an embodiment of the present invention. As with empty skip list 200 described above, populated skip list 300 includes both a head node 310 and a tail node 311. Between head node 310 and tail node 311 are a number of visible nodes 301-305. These visible nodes 301-305 contain keys $K_1$-$K_5$ and values $V_1$-$V_5$, respectively. They also contain next pointer arrays of varying sizes. Note that each next pointer points to the immediately following node that reaches or exceeds the height of the next pointer.

Node Deletion

Figure 4:
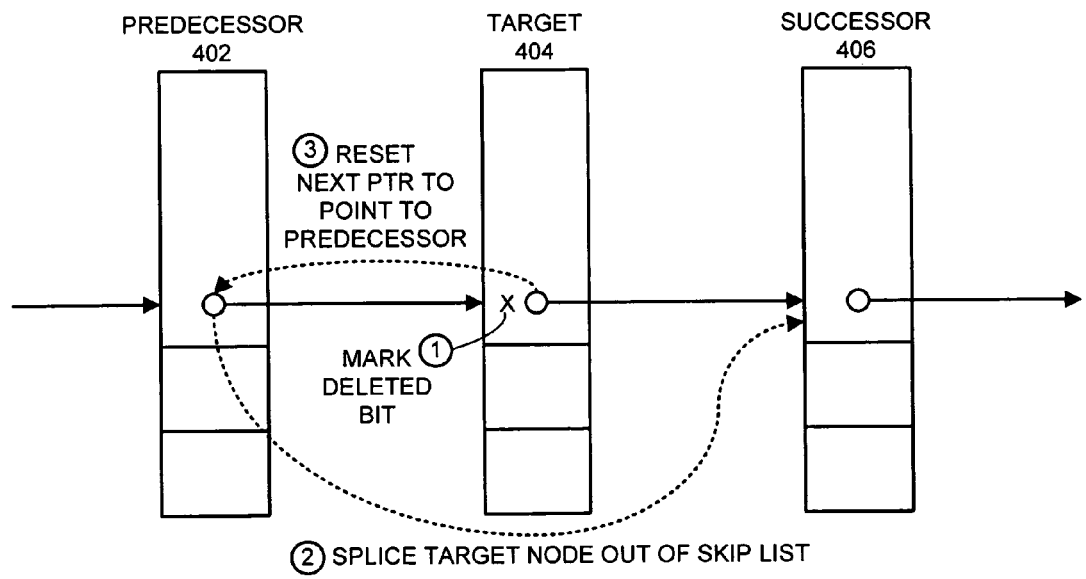
FIG. 4 illustrates the node deletion process in accordance with an embodiment of the present invention.

FIG. 4A illustrates the node deletion process in accordance with an embodiment of the present invention. FIG. 4A illustrates a target node 404 to be deleted as well as an immediately preceding predecessor node 402 and an immediately following successor node 406.

This embodiment of the present invention uses a three-stage deletion process. In the first stage, the next pointer of the target node is first marked "deleted" by flipping a special deleted bit in the next pointer. Note that this marking operation involves using an atomic operation, such as a compare-and-swap operation, so that multiple threads cannot interfere with the marking process. Once target node 404 is so marked, all other threads in the system recognize its new status as a deleted node. This allows the other processes to complete the deletion operation if the original process performing the deletion operation stalls.

In the second stage, the next pointer of predecessor node 402 is changed to point to successor node 406. This operation effectively splices target node 404 out of the linked list.

In the third stage, the marked-deleted next pointer of target node 404 is updated to remain marked deleted but to point to predecessor node 402 instead of successor node 406. This backwards-pointing next pointer allows a process that has been "stranded in the middle" of a partial deletion to pick up again at the node it would have been operating on if the deletion operation had completed instantly. This optimization can greatly improve the efficiency of the node deletion process. Note that this third stage is not essential. Hence, in one embodiment of the present invention, if the thread that performed the second stage stalls, the third step will not be accomplished until the thread wakes up.

Figure 4B:
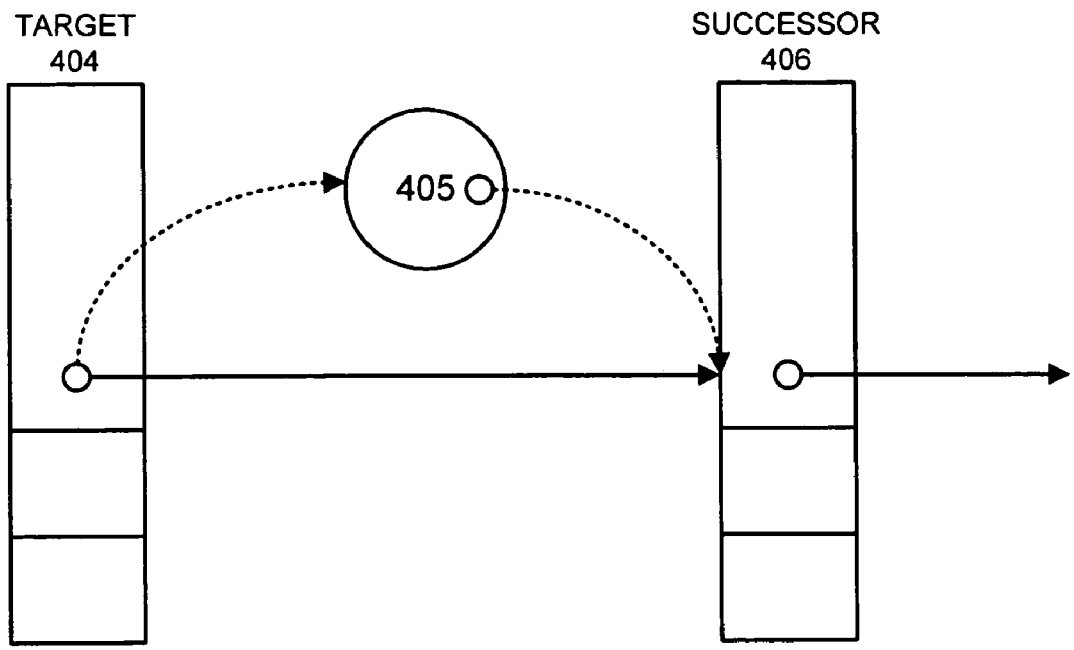
FIG. 4B illustrates an alternative marking process that replaces the next pointer with a pointer to a special delete type node in accordance with an embodiment of the present invention.

In one embodiment of the present invention, instead of setting the delete bit to mark the next pointer, the system creates a special "delete type" node 405, which points to the immediately following node in the skip list, and replaces the next pointer in target node 404 with a pointer to special node 405 as is illustrated in FIG. 4B. It is then possible to determine if a node is deleted by looking to see if its next pointer points to a "deleted type" node. In this embodiment, swinging the next pointer of target node 404 back to point to predecessor node 402 involves setting the pointer within special node 405 to point back to predecessor node 402. Note that this technique does not require the garbage collection process to be modified to ignore delete bits.

A node in the skip list can possibly be a tall node that includes one or more higher-level next pointers, wherein a higher-level next pointer contains the address of the immediately following node in the skip list that reaches or exceeds the height of the higher-level next pointer. If the target node is a tall node, the node deletion operation additionally involves marking and splicing around higher-level next pointers in the target node. With a taller node, the process marks as deleted, splices around, then optionally reverses the highest pointer first. Each lower-level pointer is "deleted" in turn. Deleting the bottom (lowest-level) pointer is the action that really deletes the node; all higher-level deletions merely shorten the node.

Figure 5:
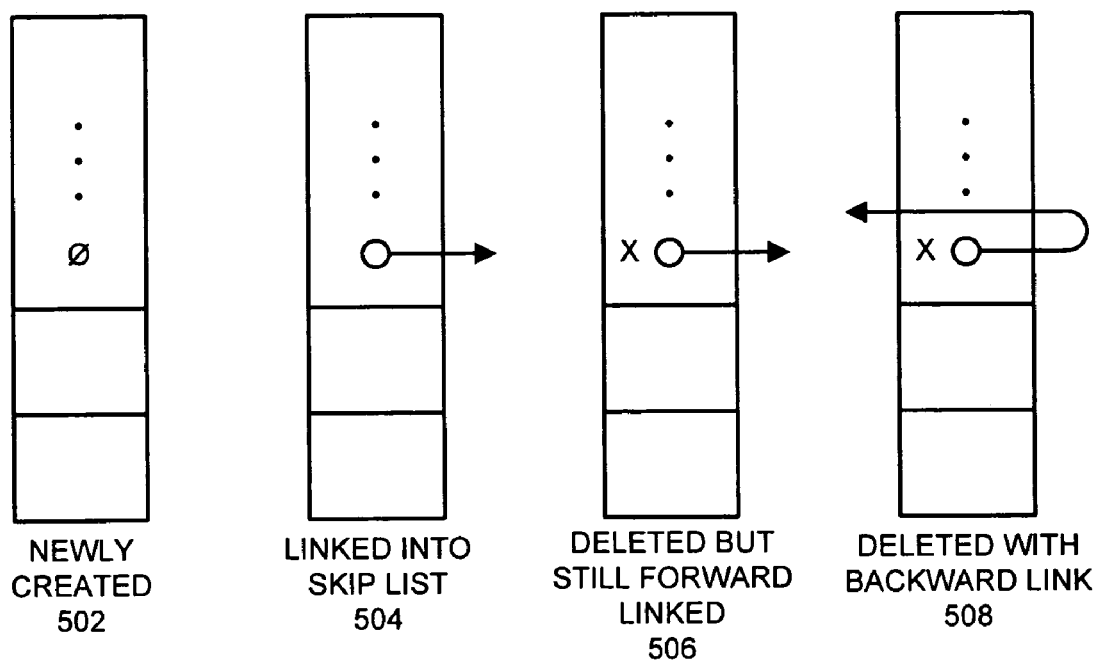
FIG. 5 illustrates the life cycle of a next pointer for a node in a skip list in accordance with an embodiment of the present invention.

FIG. 5 illustrates the life cycle of a lowest-level next pointer for a node in a skip list in accordance with an embodiment of the present invention. When the node is newly created, the lowest-level next pointer is initially set to a null value (see 502). Next, when the node is linked into the skip list, the lowest-level next pointer is set to point to the immediately following node in the skip list (see 504). Next, the node is deleted by setting the deleted bit in the lowest-level next pointer, and the next pointer remains forward-pointing (see 506). Finally, the deleted bit remains set while the next pointer is reset to point backwards to the immediately preceding node (see 508). Note that if one thread is "tearing down" a tall node that has not been completely inserted, a "high" pointer may go directly from null to deleted.

Node Insertion

Figure 6A:
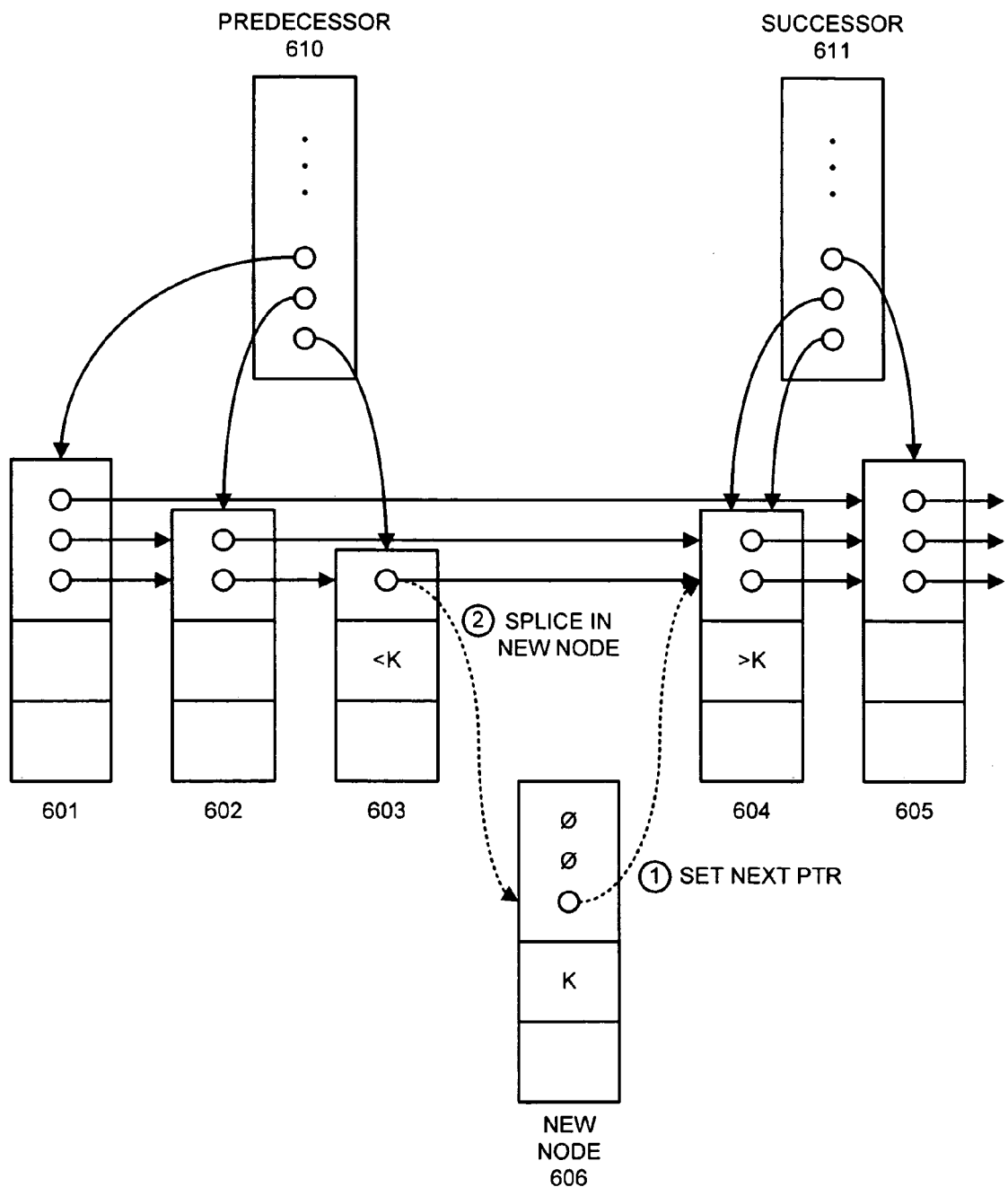
FIG. 6A illustrates operations that take place during the node insertion process in accordance with an embodiment of the present invention.

FIG. 6A illustrates operations involving the next pointer during the node insertion process in accordance with an embodiment of the present invention. As is illustrated in FIG. 6, the node insertion process operates on the skip list, including nodes 601-605. It makes use of a predecessor array 610 to keep track of the immediately preceding node for each level of the skip list, and a successor array 611 to keep track of the immediately following node for each level of the skip list.

The node insertion process first scans through the skip list to locate predecessor and successor nodes for the new node 606 in the skip list. This can be accomplished by following the tallest pointer chain keeping track of a predecessor and successor node until the successor node has a value higher than the target. This process loops by descending to the next lower layer and following the predecessor links at that level until the bottom layer is reached.

At the end of this process, the system has populated predecessor array 610 and a populated successor array 611 as is illustrated in FIG. 6A. More specifically, at the first level, predecessor array 610 and successor array 611 indicate that the immediately preceding node is 603 and the immediately following node is 604. Similarly, at the second level, the immediately preceding node is 602 and the immediately following node is 604, and at the third level, the immediately preceding node is 601 and the immediately following node is 605.

Next, the system splices new node 606 into the skip list by first setting the next pointer for new node 606 to point to the immediately following node 604 (step 1), and then atomically updating the next pointer of the immediately preceding node 603 to point to new node 606 (step 2). If the predecessor pointer has been changed by another thread, this atomic update will fail, and the predecessor array 610 and successor array 611 must be (at least partially) recomputed before retrying the update.

Figure 6B:
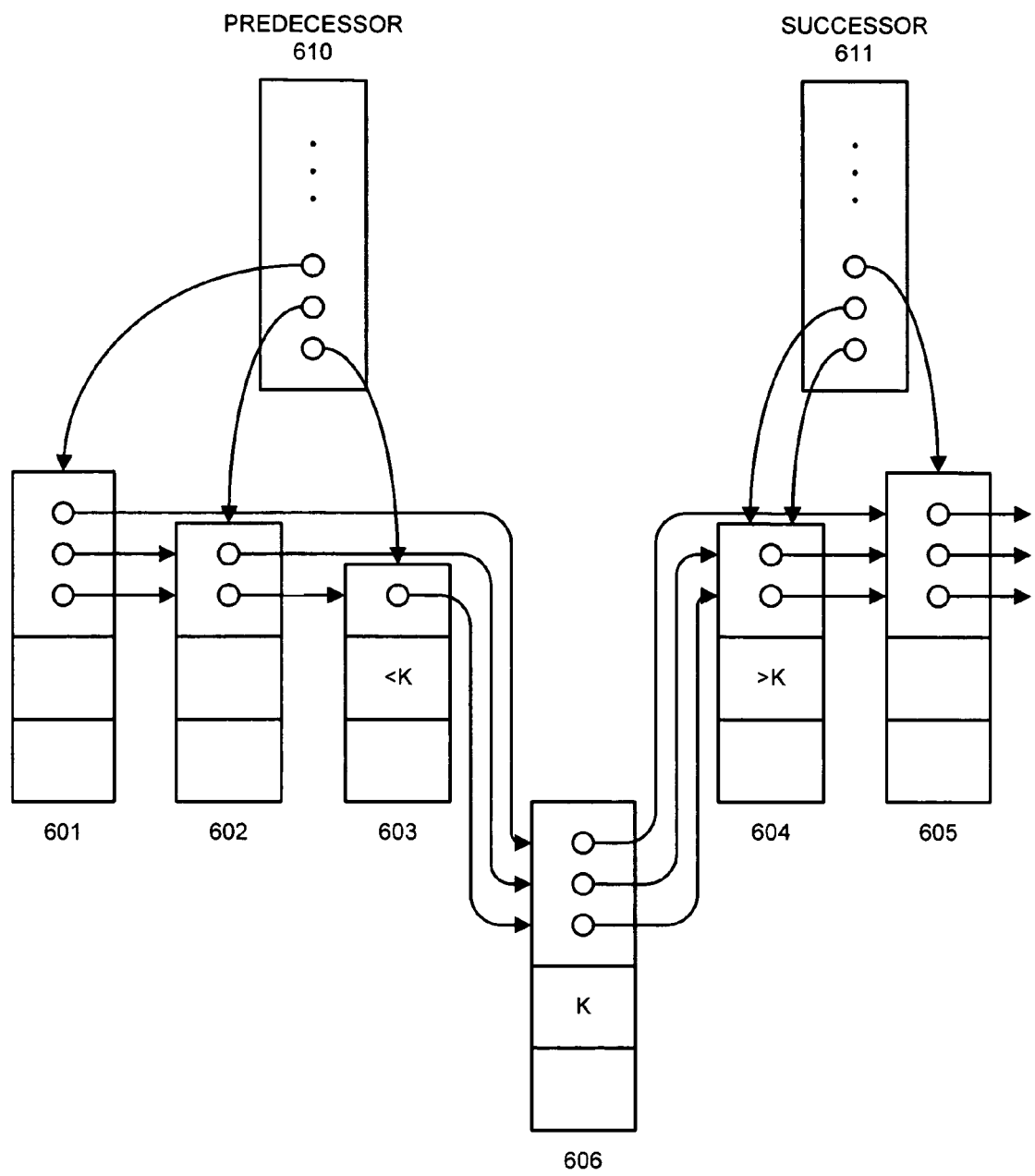
FIG. 6B illustrates operations involving higher-level next pointers for the node insertion process in accordance with an embodiment of the present invention.

FIG. 6B illustrates operations involving higher-level next pointers for the node insertion process in accordance with an embodiment of the present invention. If new node 606 is a tall node that includes higher-level next pointers, the system similarly splices the higher-level next pointers associated with new node 606. The process works from the lower levels towards the highest, recomputes predecessor array 610 and successor array 611 if the atomic update fails, and stops if a level has been marked deleted.

Incremental Structure Modification

In one embodiment of the present invention, the higher parts of a deleted node can be torn down piecemeal by each process that encounters one, recognizing the node's deleted status from the bit in their lowest-level pointer and using the same three-stage pointer deletion technique.

In this embodiment, the higher parts of a new insertion are built up from the bottom by the thread that inserted it. If this thread stalls, then the higher parts are just not in use—the remainder is a valid node. The cost of this approach is that a number of nodes proportional to the number of dead or stalled insertion processes will exist at any time.

Process Interference

Note that any number of threads seeking nodes, but not adding or deleting them, can cooperate without interference. Moreover, two or more threads attempting to delete the same node eventually end in a race to be the first to set its deleted flag bit; the first to succeed blocks all the others.

Any attempt to add new successor to a node that is being deleted is thwarted by the deletion bit on its "next" pointer.

If the deletion has set that bit, no successor can be added, and if the successor has been added, the attempt to delete it will be retried.

In general, the discovery that a node being used at any level for navigation (including the base level) has been deleted calls for a recovery move, and this is accomplished by two mechanisms.

Recovery from Deletions

The basic recovery technique, when the node being worked on is discovered to have been deleted, is to test whether its "next" pointer has been turned back to point upstream. If so, then following the next pointer will lead to the node that was its predecessor node when it was deleted. If this node is still alive, then the recovery is complete; the predecessor node will point beyond the deleted node.

Other the other hand, if the node is marked deleted but its "next" pointer still points "forward," then the node that was previously its predecessor may still point to it. If so, the current process takes on the task of splicing around the deleted node and turning the next pointer of the deleted node back.

If the predecessor found during the search no longer points to the deleted node, then the system retreats to the next higher pointer level and recommences the search from this next-higher level. This "higher ground" recovery technique is applied recursively until the top level is reached. At this point, a restart from the head sentinel can be used.

Note that turning back of pointers makes the recovery immediate in most cases and only slightly complicates the design. Moreover, the updating of pointers to turn them around can be accomplished through normal write operations, thereby saving the execution cost of a compare-and-swap instruction.

One of the uses for a skip list is as a queue that holds an arbitrary number of items at an arbitrary number of priorities. If the skip list is to be used in this manner, the representation of priority or the orientation of the key ordering in the list should be arranged so that the node adjacent to the head dummy is always the one that is next to be popped off, since in this special case the time required for removal of a node is linear rather than logarithmic.

Garbage Collection

This skip list is described for use in a garbage-collected environment, but the garbage collector needs to be smart enough to recognize that a pointer to X still points to X whether or not an embedded "deleted" bit is set. Alternatively, this list can be run with collection done by the ROP Pass the Buck scheme, but that scheme will need to be extended to guard the nodes pointed to by the head sentinel of the list. (For a description of this ROP scheme see "The Repeat Offender Problem: A Mechanism for Supporting Dynamic-Sized, Lock-Free Data Structures," by Maurice Herlihy, Victor Luchangco and Mark Moir, *Proceedings of Distributed Computing*, 16*th International Conference, DISC* 2002, Toulouse, France, Oct. 28-30, 2002, pp. 339-353.) Note that if backward pointers are used, an additional extension to track their effects is needed.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for deleting a node from a skip list, wherein the skip list is lock-free, which means that the skip list can be simultaneously accessed by multiple processes without requiring the processes to perform locking operations, the method comprising:

receiving a reference to a target node to be deleted from the skip list;

marking a next pointer in the target node to indicate that the target node is deleted, wherein the next pointer contains the address of an immediately following node in the skip list, wherein the marking operation does not destroy the address of the immediately following node, and wherein the marking operation is performed atomically and thereby without interference from other processes; and atomically modifying the next pointer of an immediately preceding node in the skip list to point to the immediately following node in the skip list, instead of pointing to the target node, thereby splicing the target node out of the skip list.

2. The method of claim 1, wherein after the target node is spliced out of the skip list, the method further comprises modifying the next pointer of the target node so that the next pointer remains marked but points to the immediately preceding node instead of the immediately following node in the skip list.

3. The method of claim 1, wherein a node in the skip list can possibly be a tall node that includes one or more higher-level next pointers, wherein a given higher-level next pointer contains the address of the immediately following node in the skip list that reaches or exceeds the height of the given higher-level next pointer; and wherein if the target node is a tall node, the method further comprises similarly marking and splicing around higher-level next pointers in the target node.

4. The method of claim 1, wherein marking the next pointer to indicate that the target node is deleted involves setting a "deleted bit" in the next pointer.

5. The method of claim 1, wherein marking the next pointer to indicate that the target node is deleted involves:

creating a special node with a deleted type, which points to the immediately following node in the skip list; and atomically replacing the next pointer with a pointer to special node.

6. The method of claim 1, further comprising inserting a new node into the skip list by:

locating a node immediately preceding the new node in the skip list, wherein locating the immediately preceding node involves maintaining a predecessor array, wherein for each level of the skip list, the predecessor array contains a pointer to the node immediately preceding the new node in the skip list;

locating a node immediately following the new node in the skip list, wherein locating the immediately following node involves maintaining a successor array, wherein for each level of the skip list, the successor array contains a pointer to the immediately following node; and splicing the new node into the skip list by, setting the next pointer for the new node to point to the immediately following node, atomically updating the next pointer of the immediately preceding node to point to the new node, and if the new node is a tall node, similarly splicing higher-level next pointers associated with the new node.

7. The method of claim 1, further comprising removing a highest priority node from the skip list through a constant time operation, wherein the head node of the skip list points to the highest priority node for ease of deletion, and wherein keys for nodes are chosen to achieve this ordering.

8. The method of claim 1, further comprising periodically performing a garbage-collection operation to reclaim deleted nodes that have become unreachable.

9. The method of claim 1, wherein the target node includes:
   a key that contains a priority value for the node in the skip list;
   a value field that contains or points to data associated with the node;
   a next pointer that contains the address of an immediately following node in the skip list; and
   zero or more higher-level next pointers, wherein a given higher-level next pointer contains the address of the immediately following node in the skip list that reaches or exceeds the height of the given next pointer.

10. A computer-readable storage medium storing instructions that when executed by a computer cause the computer to perform a method for deleting a node from a skip list, wherein the skip list is lock-free, which means that the skip list can be simultaneously accessed by multiple processes without requiring the processes to perform locking operations, the method comprising:
   receiving a reference to a target node to be deleted from the skip list;
   marking a next pointer in the target node to indicate that the target node is deleted, wherein the next pointer contains the address of an immediately following node in the skip list, wherein the marking operation does not destroy the address of the immediately following node, and wherein the marking operation is performed atomically and thereby without interference from other processes; and
   atomically modifying the next pointer of an immediately preceding node in the skip list to point to the immediately following node in the skip list, instead of pointing to the target node, thereby splicing the target node out of the skip list.

11. The computer-readable storage medium of claim 10, wherein after the target node is spliced out of the skip list, the method further comprises modifying the next pointer of the target node so that the next pointer remains marked but points to the immediately preceding node instead of the immediately following node in the skip list.

12. The computer-readable storage medium of claim 10,
   wherein a node in the skip list can possibly be a tall node that includes one or more higher-level next pointers, wherein a given higher-level next pointer contains the address of the immediately following node in the skip list that reaches or exceeds the height of the given higher-level next pointer; and
   wherein if the target node is a tall node, the method further comprises similarly marking and splicing around higher-level next pointers in the target node.

13. The computer-readable storage medium of claim 10, wherein marking the next pointer to indicate that the target node is deleted involves setting a "deleted bit" in the next pointer.

14. The computer-readable storage medium of claim 10, wherein marking the next pointer to indicate that the target node is deleted involves:
   creating a special node with a deleted type, which points to the immediately following node in the skip list; and
   atomically replacing the next pointer with a pointer to special node.

15. The computer-readable storage medium of claim 10, wherein the method further comprises inserting a new node into the skip list by:
   locating a node immediately preceding the new node in the skip list, wherein locating the immediately preceding node involves maintaining a predecessor array, wherein for each level of the skip list, the predecessor array contains a pointer to the node immediately preceding the new node in the skip list;
   locating a node immediately following the new node in the skip list, wherein locating the immediately following node involves maintaining a successor array, wherein for each level of the skip list, the successor array contains a pointer to the immediately following node; and
   splicing the new node into the skip list by,
      setting the next pointer for the new node to point to the immediately following node,
      atomically updating the next pointer of the immediately preceding node to point to the new node, and
      if the new node is a tall node, similarly splicing higher-level next pointers associated with the new node.

16. The computer-readable storage medium of claim 10, wherein the method further comprises removing a highest priority node from the skip list through a constant time operation, wherein the head node of the skip list points to the highest priority node for ease of deletion, and wherein keys for nodes are chosen to achieve this ordering.

17. The computer-readable storage medium of claim 10, wherein the method further comprises periodically performing a garbage-collection operation to reclaim deleted nodes that have become unreachable.

18. The computer-readable storage medium of claim 10, wherein the target node includes:
   a key that contains a priority value for the node in the skip list;
   a value field that contains or points to data associated with the node;
   a next pointer that contains the address of an immediately following node in the skip list; and
   zero or more higher-level next pointers, wherein a given higher-level next pointer contains the address of the immediately following node in the skip list that reaches or exceeds the height of the given next pointer.

19. An apparatus for deleting a node from a skip list, wherein the skip list is lock-free, which means that the skip list can be simultaneously accessed by multiple processes without requiring the processes to perform locking operations, the apparatus comprising:
   a receiving mechanism configured to receive a reference to a target node to be deleted from the skip list;
   a marking mechanism configured to mark a next pointer in the target node to indicate that the target node is deleted, wherein the next pointer contains the address of an immediately following node in the skip list, wherein the marking operation does not destroy the address of the immediately following node, and wherein the marking operation is performed atomically and thereby without interference from other processes; and a splicing mechanism configured to atomically modify the next pointer of an immediately preceding node in the skip list to point to the immediately following node in the skip list, instead of pointing to the target node, thereby splicing the target node out of the skip list.

20. The apparatus of claim 19, wherein after the target node is spliced out of the skip list, the splicing mechanism is configured to modify the next pointer of the target node so that the next pointer remains marked but points to the immediately preceding node instead of the immediately following node in the skip list.

21. The apparatus of claim 19,
wherein a node in the skip list can possibly be a tall node that includes one or more higher-level next pointers, wherein a given higher-level next pointer contains the address of the immediately following node in the skip list that reaches or exceeds the height of the given higher-level next pointer; and
wherein if the target node is a tall node, the marking mechanism and the splicing mechanism are similarly configured to mark and splice around higher-level next pointers in the target node.

22. The apparatus of claim 19, wherein while marking the next pointer to indicate that the target node is deleted, the marking mechanism is configured to set a "deleted bit" in the next pointer.

23. The apparatus of claim 19, wherein while marking the next pointer to indicate that the target node is deleted, the marking mechanism is configured to:
create a special node with a deleted type, which points to the immediately following node in the skip list; and to
atomically replace the next pointer with a pointer to special node.

24. The apparatus of claim 19, further comprising an insertion mechanism configured to insert a new node into the skip list, wherein the insertion mechanism is configured to:
locate a node immediately preceding the new node in the skip list, wherein locating the immediately preceding node involves maintaining a predecessor array, wherein for each level of the skip list, the predecessor array contains a pointer to the node immediately preceding the new node in the skip list;
locate a node immediately following the new node in the skip list, wherein locating the immediately following node involves maintaining a successor array, wherein for each level of the skip list, the successor array contains a pointer to the immediately following node; and to
splice the new node into the skip list by,
setting the next pointer for the new node to point to the immediately following node,
atomically updating the next pointer of the immediately preceding node to point to the new node, and
if the new node is a tall node, similarly splicing higher-level next pointers associated with the new node.

25. The apparatus of claim 19, further comprising a popping mechanism configured to remove a highest priority node from the skip list through a constant time operation, wherein the head node of the skip list points to the highest priority node for ease of deletion, and wherein keys for nodes are chosen to achieve this ordering.

26. The apparatus of claim 19, further comprising a garbage collection mechanism configured to periodically perform a garbage-collection operation to reclaim deleted nodes that have become unreachable.

27. The apparatus of claim 19, wherein the target node includes:
a key that contains a priority value for the node in the skip list;
a value field that contains or points to data associated with the node;
a next pointer that contains the address of an immediately following node in the skip list; and
zero or more higher-level next pointers, wherein a given higher-level next pointer contains the address of the immediately following node in the skip list that reaches or exceeds the height of the given next pointer.

* * * * *